US010148212B2

(12) United States Patent
Schumacher et al.

(10) Patent No.: US 10,148,212 B2
(45) Date of Patent: Dec. 4, 2018

(54) DC TO DC CONVERTER SOURCING VARIABLE DC LINK VOLTAGE

(71) Applicant: THERMO KING CORPORATION, Minneapolis, MN (US)

(72) Inventors: Ryan Wayne Schumacher, Bloomington, MN (US); Marcelo Andrade Dias, Minneapolis, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

(21) Appl. No.: 15/400,316

(22) Filed: Jan. 6, 2017

(65) Prior Publication Data
US 2018/0198399 A1    Jul. 12, 2018

(51) Int. Cl.
| | |
|---|---|
| *H02P 7/00* | (2016.01) |
| *H02P 25/02* | (2016.01) |
| *H02M 3/158* | (2006.01) |
| *H02M 7/06* | (2006.01) |
| *H02P 27/06* | (2006.01) |
| *F25B 49/02* | (2006.01) |

(52) U.S. Cl.
CPC ............ *H02P 25/02* (2013.01); *H02M 3/158* (2013.01); *H02M 7/06* (2013.01); *H02P 27/06* (2013.01); *F25B 49/022* (2013.01); *F25B 2600/0252* (2013.01); *F25B 2600/0253* (2013.01)

(58) Field of Classification Search
USPC ................................................. 318/722, 474
See application file for complete search history.

(56) References Cited

U.S. PATENT DOCUMENTS

| | | | | |
|---|---|---|---|---|
| 3,967,175 | A | * | 6/1976 | Turley ..................... B60K 6/46 318/258 |
| 7,049,774 | B2 | | 5/2006 | Chin et al. |
| 8,149,603 | B2 | | 4/2012 | Huang et al. |
| 8,860,359 | B2 | | 10/2014 | Cao et al. |

(Continued)

FOREIGN PATENT DOCUMENTS

| | | |
|---|---|---|
| DE | 102007003415 | 7/2008 |
| EP | 2884641 | 6/2015 |
| WO | 9956384 | 11/1999 |

OTHER PUBLICATIONS

European Search Report issued in corresponding European Application No. 18150512.4 dated May 23, 2018 (6 pages).

*Primary Examiner* — Jorge L Carrasquillo
(74) *Attorney, Agent, or Firm* — Hamre, Schumann, Mueller & Larson, P.C.

(57) ABSTRACT

An inverter-converter system includes a DC source, a DC to DC boost converter, a DC link capacitor, an inverter circuit, a variable speed electric machine, and a controller. The DC to DC boost converter receives an input DC voltage from the DC source. The inverter circuit converts the variable boosted voltage to an AC voltage to drive the variable speed electric machine. The controller senses a plurality of parameters from the variable speed electric machine, and controls the DC to DC boost converter to boost up the input DC voltage to a variable output voltage based on the plurality of parameters and/or the voltage (or load) needed by the variable speed electric machine. The design of the inverter-converter system can achieve an electrical efficiency and cost savings for the overall system.

19 Claims, 4 Drawing Sheets

(56) References Cited

U.S. PATENT DOCUMENTS

| | | | |
|---|---|---|---|
| 8,981,686 B2 | 3/2015 | Becerra et al. | |
| 9,653,998 B2* | 5/2017 | Wu | H02M 3/158 |
| 2011/0075455 A1* | 3/2011 | Sigamani | H02M 7/48 |
| | | | 363/71 |
| 2012/0249111 A1* | 10/2012 | Guo | H02M 3/158 |
| | | | 323/311 |
| 2012/0256561 A1* | 10/2012 | Kwon | H05B 33/0827 |
| | | | 315/307 |
| 2013/0336012 A1* | 12/2013 | Broussev | H02M 1/15 |
| | | | 363/16 |
| 2014/0104889 A1 | 4/2014 | Yamada et al. | |
| 2014/0104952 A1* | 4/2014 | Takeuchi | G11C 16/06 |
| | | | 365/185.17 |
| 2015/0171775 A1* | 6/2015 | Cho | F25B 49/025 |
| | | | 62/228.1 |
| 2016/0261190 A1* | 9/2016 | Shenoy | H02M 3/158 |

* cited by examiner

DC TO DC CONVERTER SOURCING VARIABLE DC LINK VOLTAGE

FIELD

This disclosure relates generally to the power management of a direct current (DC) to direct current converter (DC to DC converter) for a heating, ventilation, and air conditioning (HVAC) system. More specifically, the disclosure relates to devices, systems and methods for efficiently sourcing a multiple DC link voltage to drive a variable speed electric machine in a HVAC system.

BACKGROUND

A boost converter is a DC to DC converter that changes a source (i.e. input) voltage to an output voltage greater than the source voltage. The source voltage can be any suitable DC source, such as a rectifier, a DC generator, a battery, a solar panel, etc. A typical switch-mode boost converter includes an inductor, a switch, and a flywheel diode. The switch is can be a Metal-Oxide-Semiconductor Field-Effect Transistor (MOSFET), an Insulated Gate Bipolar Transistor (IGBT), or a Bipolar Junction Transistor (BJT), or the like. The flywheel diode can be replaced by a MOSFET. A typical boost converter can boost a fixed source voltage to a fixed output voltage.

SUMMARY

This disclosure relates generally to the power management of a DC to DC converter for powering a HVAC system. More specifically, the disclosure relates to devices, systems and methods for efficiently sourcing a multiple DC link voltage to drive a variable speed electric machine in a HVAC system.

In one embodiment, an inverter-converter system for a HVAC system includes a DC to DC boost converter, a DC source providing an input DC voltage to the DC to DC boost converter, a controller, and a variable speed electric machine. The controller is configured to obtain a plurality of sensed parameters, for example, a load of the variable speed electric machine, to control the DC to DC boost converter to generate one of a first boosted voltage and a second boosted voltage based on the sensed plurality of parameters.

In one embodiment, the DC to DC boost converter includes a first boost circuit that has a first inductor and a first set of switches. The DC to DC boost converter further includes a second boost circuit that has a second inductor and a second set of switches. In one embodiment, the first set of switches and the second set of switches can be N-type metal-oxide-semiconductor (MNOS) switch elements. In one embodiment, the first inductor and/or the second inductor can be a tapped winding electromagnetic coil with or without a magnetic core. In another embodiment, the first inductor and/or the second inductor can be a flyback transformer with or without magnetic core. The energy storage magnetics, for example, the inductors, can have multiple taps available. The taps can be chosen to optimize the amount of inductance required by the DC to DC boost converter to lower power losses in the DC to DC boost converter. A tap can be accompanied by a pair of switch elements. For each additional tap of the magnetics, an additional pair of switch elements would be required. If an upstream tap is not required, the pair of switch elements for that tap is turned off. To perform the boost function, the DC to DC boost converter would have to be synchronous rectification with the pair of switch elements for their corresponding tap/inductor.

In one embodiment, the inverter-converter system for a HVAC system includes a DC to DC boost converter. The DC to DC boost converter includes a first boost circuit having a first inductor and a first set of switches, and a second boost circuit having a second inductor and a second set of switches. In one embodiment, the first inductor is connected to the second inductor in series when the first set of switches is off. When the second set of switches is off, the first boost circuit is configured to boost an input DC voltage to a first boosted voltage. When the first set of switches is off, the first inductor and the second boost circuit are configured to boost the input DC voltage to a second boosted voltage. The inverter-converter system also includes a DC source providing the input DC voltage to the DC to DC boost converter, a variable speed electric machine, and a controller that determines a load of the variable speed electric machine and controls the first and the second sets of switches based on the sensed load of the variable speed electric machine. In one embodiment, the DC to DC boost converter is configured to source one of the first boosted voltage and the second boosted voltage to the variable speed electric machine based on the sensed load of the variable speed electric machine.

In one embodiment, the DC to DC boost converter for a HVAC system includes a first boost circuit having a first inductor and a first set of switches, and a second boost circuit having a second inductor and a second set of switches. In one embodiment, the first inductor is connected to the second inductor in series when the first set of switches is off. In one embodiment, when the second set of switches is off, the first boost circuit is configured to boost an input DC voltage to a first boosted voltage. When the first set of switches is off, the first inductor and the second boost circuit are configured to boost the input DC voltage to a second boosted voltage.

In one embodiment, a DC to DC boost converter includes a first boost circuit having a first inductor and a first set of switches, and a second boost circuit having a second inductor and a second set of switches. The first inductor is connected to the second inductor in series when the first set of switches is off. In such embodiment, a method for operating the DC to DC boost converter includes receiving an input DC voltage from a DC source, and sensing a load of a variable speed electric machine. The method further includes when the load of the variable speed electric machine is sensed to require a first boosted voltage, switching the second set of switches off and the first boost circuit boosting the input DC voltage to the first boosted voltage. The method also includes when the load of the variable speed electric machine is sensed to require a second boosted voltage, switching the first set of switches off and the first inductor combined with the second boost circuit boosting the input DC voltage to the second boosted voltage.

One of the advantages of the inverter-converter system is to optimize the electrical efficiency by using multiple tapped winding electromagnetic coils in the DC to DC boost converter to provide multiple boosted voltages to a DC link to drive a variable speed electric machine. A multiple output voltage DC to DC boost converter (that can generate variable boosted voltages) can have much higher efficiency than a single output voltage boost converter. Based on optimum operation points of the variable speed electric machine, the DC to DC boost converter can be designed to generate optimum boosted voltages with optimum tap of the windings of the electromagnetic coils.

One of the advantages of the inverter-converter system is to optimize the efficiency for the variable speed electric machine at partial load, which makes up a significant portion of the overall runtime of the variable speed electric machine. The inverter-converter system can include a DC link capacitor. The boosted voltage by the DC to DC boost converter and the capacitance of the DC link capacitor can be designed for a highest load and highest voltage operation of the variable speed electric machine. At a lower load and lower voltage operation of the variable speed electric machine, such design would have extra design margin (for example, an extra capacitance design margin) that would lead to an increased life time of the components, for example, an increased life time of the DC link capacitor.

Another advantage of the inverter-converter system is to achieve optimum performance or maximum efficiency of using the energy source, for example, a battery with limited capacity to ultimately drive the variable speed electric machine in an Auxiliary Power Unit (APU) application for a vehicle HVAC system. Another advantage of the inverter-converter system is to achieve optimum or maximum system efficiency to meet emissions laws.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTIONS

This disclosure relates generally to the power management of a DC to DC converter for a HVAC system. More specifically, the disclosure relates to devices, systems and methods for efficiently sourcing a multiple DC link voltage to drive a variable speed electric machine in a HVAC system.

Figure 1:
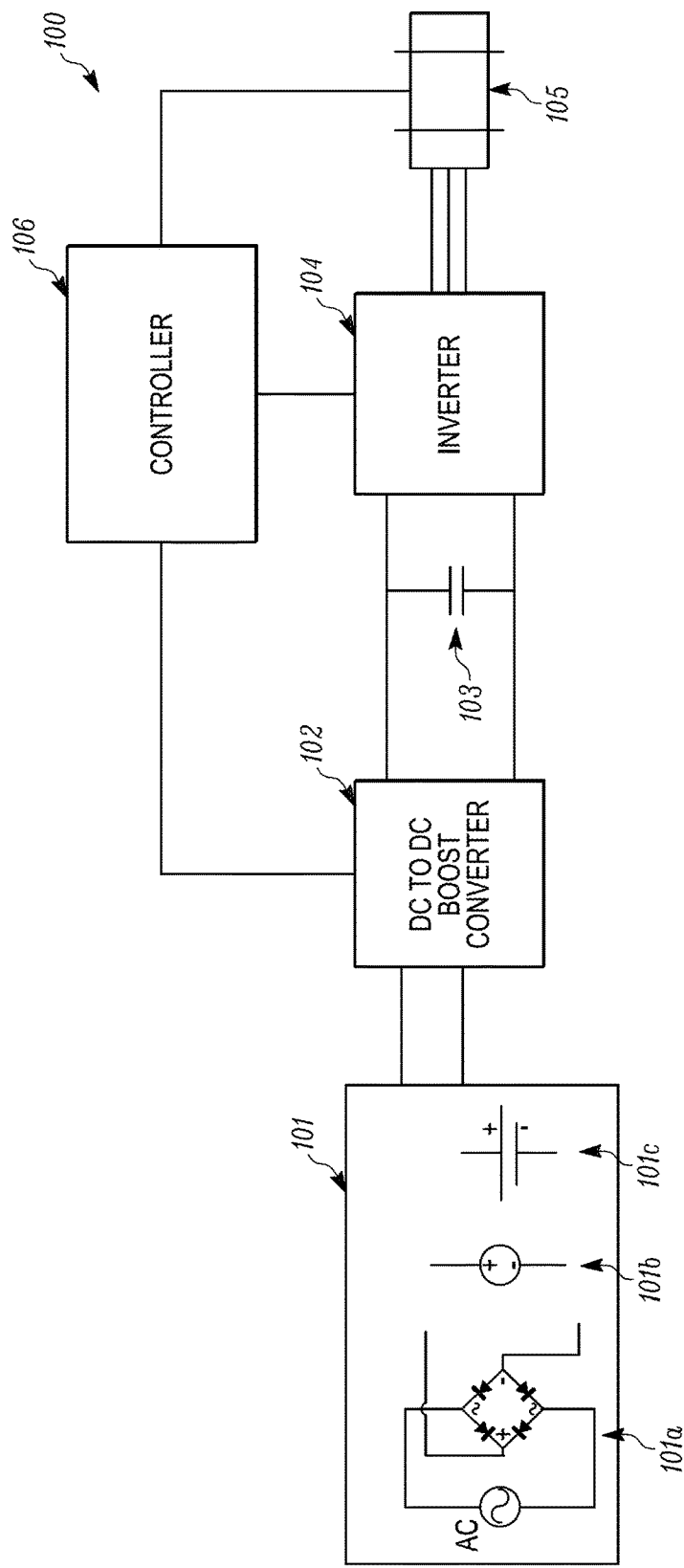
FIG. 1 is a schematic illustration of an inverter-converter system for a HVAC system, according to some embodiments.

FIG. 1 is a schematic illustration of an inverter-converter system 100 for a HVAC system, according to some embodiments. The inverter-converter system 100 includes a DC source 101, a DC to DC boost converter 102, a DC link capacitor 103, an inverter circuit 104, a variable speed electric machine 105, and a controller 106. It will be appreciated that in other embodiments, the DC link capacitor 103 can be part of the DC to DC boost converter 102.

The DC source 101 provides an input DC voltage to the DC to DC boost converter 102. The DC to DC boost converter 102 receives the input DC voltage from the DC source 101. In FIG. 1, the DC source 101 can be a rectified alternating current (AC) shore power source 101a, a vehicle DC power supply 101b, or a DC battery 101c. The rectified AC shore power source 101a can come from, for example, a 120 volts, 220 volts, or 240 volts input. In one embodiment, the vehicle DC power supply 101b can be an alternator coupled to, for example, a prime mover of the vehicle. In will be appreciated that the DC source 101 is not limited to the examples discussed above and can be any suitable DC power source. In one embodiment, the input DC voltage provided by the DC source 101 can be 12 volts. In other embodiments, the input DC voltage can be any suitable DC voltage, for example, 24 volts or 48 volts.

The DC to DC boost converter 102 boosts up the input DC voltage from the DC source 101 to a variable output voltage to the DC link capacitor 103. In one embodiment, the DC to DC boost converter 102 can boost the input DC voltage boost voltage to, for example, 170 volts. In another embodiment, the DC to DC boost converter 102 can boost the input DC voltage boost voltage to, for example, 340 volts. It will be appreciated that in other embodiments, the DC to DC boost converter 102 can boost the input DC voltage to any suitable voltage (for example, 170 volts, 240 volts, 340 volts, etc.) as required for desired application. In some embodiments, the DC to DC boost converter 102 can include a first DC to DC converter (not shown) that converts the input voltage to 12 volts, and a second DC to DC converter (not shown) that boosts up the 12 volts input voltage to a variable output voltage, with the variable output voltage being sent to the DC link capacitor 103.

The DC link capacitor 103 stores the power obtained from the DC to DC boost converter 102 while the power is being converted back to AC power via the inverter circuit 104. In some embodiments, for a one kilo-watts operation, the DC link capacitor can be in a range of at or about 0.1 millifarad to at or about 2 millifarad for a voltage from at or about 250 volts to at or about 500 volts.

The inverter circuit 104 converts the boosted voltage outputted by the DC to DC boost converter 102 to an AC voltage to drive the variable speed electric machine 105. In some embodiments, the inverter circuit 104 (sometimes called an inverter bridge) can include switches (not shown). The switches can be controlled on and/or off to generate a variable power (for example, variable frequency, variable current, variable voltage, etc.) from an input DC voltage (i.e. the boosted voltage outputted by the DC to DC boost converter 102) to drive the variable speed electric machine 105. Matching the AC voltage and the voltage needed by the variable speed electric machine 105 can be an efficient way to utilize the energy from the DC source 101, and converting a full boosted voltage to a corresponding AC voltage can be an efficient conversion for the inverter circuit 104. The embodiments described herein can get a lower boosted voltage from the DC link capacitor 103 (i.e. from the DC to DC boost converter 102) when the voltage needed by the variable speed electric machine 105 is low, and get a higher boosted voltage from the DC link capacitor 103 (i.e. from the DC to DC boost converter 102) when the voltage needed by the variable speed electric machine 105 is high. The embodiments described herein can have a controller 106 to control the DC to DC boost converter 102 to generate a variable boosted voltage based on the voltage (or load) needed by the variable speed electric machine 105.

The variable speed electric machine 105 is driven by the AC voltage from the inverter circuit 104. In some embodiments, the variable speed electric machine 105 can be, for example, a compressor (not shown), a fan, etc. In some embodiments, the compressor can be a variable speed compressor for a vehicle HVAC system. In other embodiments, the compressor can be a two-speed compressor for a HVAC system that includes a high speed/power for providing rapid cooling or heating to a space and a low speed/power for maintaining a desired temperature in the space. In one embodiment, the two-speed compressor can be a three-phase AC compressor that requires 280 volts at high speed/power and requires 140 volts at low speed/power. In another embodiment, the two-speed compressor can be a three-phase AC compressor that requires 240 volts at high speed/power and requires 120 volts at low speed/power. In general, a higher load on the variable speed electric machine 105 can require a higher speed and/or a higher voltage to drive the variable speed electric machine 105 and a lower load on the variable speed electric machine 105 can require a lower speed and/or a lower voltage to drive the variable speed electric machine 105.

The controller 106 controls the DC to DC boost converter 102 based on the voltage (or load) needed by the variable speed electric machine 105. In one embodiment, the controller 106 can receive data from a plurality of sensors (not shown). The plurality of sensors can monitor a plurality of parameters such as, for example, a mechanic torque requirement of the variable speed electric machine 105 (for example, a load on the variable speed electric machine 105), an optimum power requirement (for example, voltage, current, and/or frequency) of the variable speed electric machine 105, a calculated (or rated) speed of the variable speed electric machine 105, an output AC voltage of the inverter circuit 104, an output current of the inverter circuit 104, an output frequency of the inverter circuit 104, etc. The controller 106 can control the DC to DC boost converter 102 based on any or all of the sensed parameters. The detailed description of controlling the DC to DC boost converter 102 using the controller 106 can be found in the description of FIG. 2.

In one embodiment, the variable speed electric machine 105 can be integrated to a hermetic compressor that can be used in an APU in an HVAC system for a vehicle, for example, a semi-truck. The compressor can run at a multiple speeds based on the load on the compressor. The APU can be operated when a main prime mover of the vehicle is turned off such as, for example, when a driver parks the vehicle for an extended period of time to rest. The APU can provide, for example, power to operate a secondary HVAC unit to provide conditioned air to a cabin of the vehicle. The APU can also provide power to operate cabin accessories within the cabin such as a television, a microwave, a coffee maker, a refrigerator, etc. The compressor can run at a high speed (that requires a higher input voltage) to operate the secondary HVAC system at a high capacity provide rapid temperature control (e.g., cooling) to the cabin. The compressor can run at a low speed (that requires a lower input voltage) to operate the secondary HVAC system at a low capacity to maintain a temperature within the cabin. In some embodiments, the low speed mode can be the predominant operation mode of the compressor. It will be appreciated that generally the APU can operate more efficiently (e.g., require less energy) when the compressor is running at low speed regardless of whether the APU is a mechanically driven APU (e.g., prime mover driven) or an electrically driven APU (e.g., battery driven). For a mechanically driven APU, the prime mover can require less fuel (e.g., be more fuel efficient) when the compressor is operating at low speed versus operating at high speed. For an electrically driven APU, less energy from the battery may be required when the compressor is operating at low speed versus operating at high speed. It will be appreciated that generally operating at lower speed can result in more run time. Also, regardless of whether the APU is mechanically or electrically driven, the APU can have a limited run time based on the amount of fuel stored or based on battery capacity. Accordingly, the embodiments described herein can improve the efficiency and reduce the energy loss of the compressor and extend the battery longevity.

Figure 2:
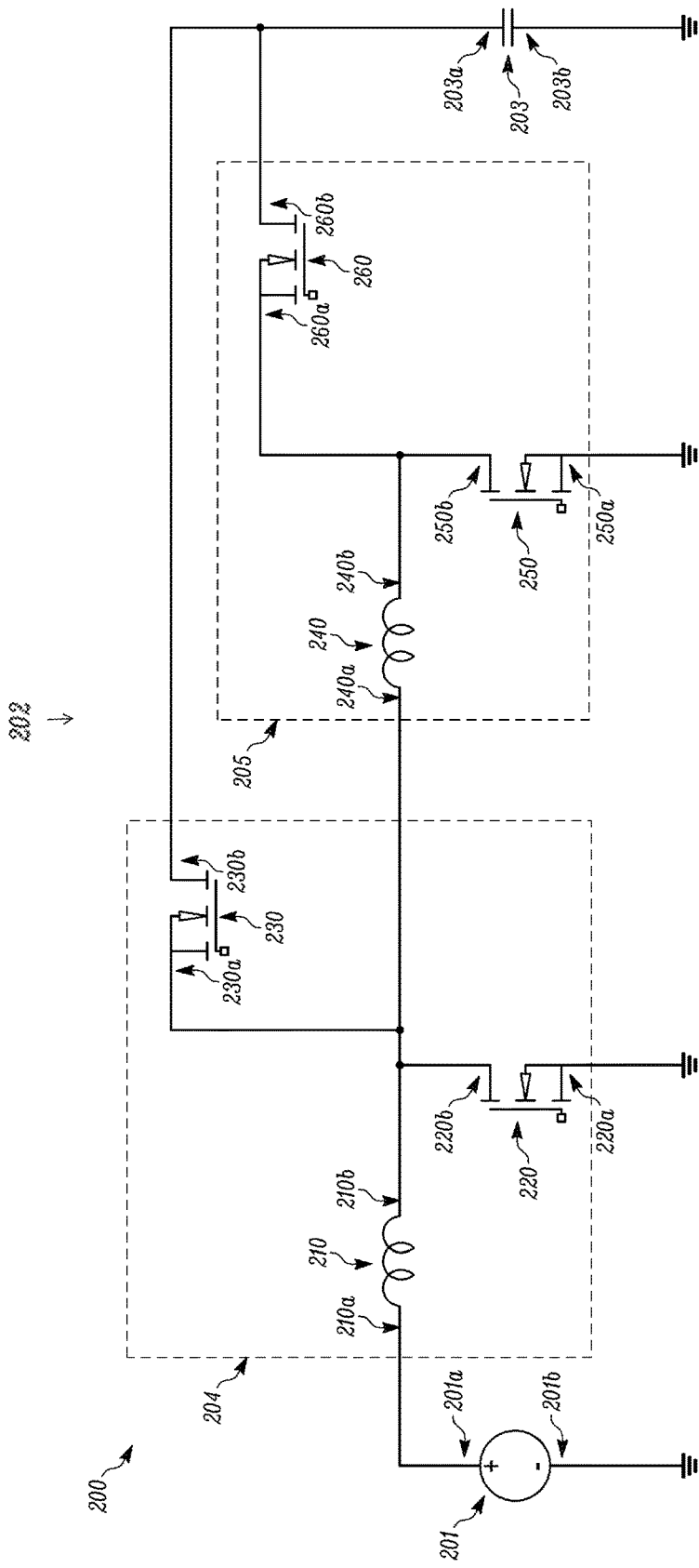
FIG. 2 is a circuit diagram of a DC to DC boost converter in a boost converter unit for a HVAC system, according to one embodiment.

FIG. 2 is a circuit diagram of a DC to DC boost converter 202 in a boost converter unit 200 for a HVAC system, according to some embodiments. The boost converter unit 200 includes a DC power supply 201, a DC to DC boost converter 202, and a DC link capacitor 203. The DC to DC boost converter 202 includes a first boost circuit 204 and a second boost circuit 205. The structure and function of the DC power supply 201 can be similar to the DC source 101 in FIG. 1. The structure and function of the DC link capacitor 203 can be similar to the DC link capacitor 103 in FIG. 1. The structure and function of the DC to DC boost converter 202 can be similar to the DC to DC boost converter 102 in FIG. 1.

Returning to FIG. 2, the first boost circuit 204 includes a first inductor 210 and a first set of switches (a first switch element 220 and a second switch element 230). The second boost circuit 205 includes a second inductor 240 and a second set of switches (a third switch element 250 and a fourth switch element 260). It will be appreciated that inductance value of the inductors can depend on specific application requirements and, for example, input and output voltages, output current and ripple, switching frequency, etc. In some embodiments, the first inductor 210 and the second inductor 240 can be tapped winding magnetics. In some embodiments, switch elements 220, 230, 250, and 260 can be one or more of a Metal-Oxide-Semiconductor Field-Effect Transistor (MOSFET), Insulated Gate Bipolar Transistor (IGBT), Bipolar Junction Transistor (BJT) or the like.

In FIG. 2, the DC power supply 201 includes a positive electrode 201*a* and a negative electrode 201*b*. The first inductor 210 includes a first end 210*a* and a second end 210*b*. The second inductor 240 includes a first end 240*a* and a second end 240*b*. The first switch element 220 includes a source terminal 220*a* and a drain terminal 220*b*. The second switch element 230 includes a source terminal 230*a* and a drain terminal 230*b*. The third switch element 250 includes a source terminal 250*a* and a drain terminal 250*b*. The fourth switch element 260 includes a source terminal 260*a* and a drain terminal 260*b*. The DC link capacitor 203 includes a first end 203*a* and a second end 203*b*.

In FIG. 2, the drain terminal 230*b* of the second switch element 230 and the drain terminal 260*b* of the fourth switch element 260 connect to the first end 203*a* of the DC link capacitor 203. The source terminal 220*a* of the first switch element 220, the source terminal 250*a* of the third switch element 250, and the negative electrode 201*b* of the DC power supply 201 connect to the second end 203*b* of the DC link capacitor 203. The drain terminal 205*b* of the third switch element 250 and the source terminal 260*a* of the fourth switch element 260 connect to the second end 240*b* of the second inductor 240. The second end 210*b* of the first inductor 210, the drain terminal 220*b* of the first switch element 220, and the source terminal 230*a* of the second switch element 230 connect to the first end 240*a* of the second inductor 240. The positive electrode 201*a* of the DC power supply 201 connects to the first end 210*a* of the first inductor 210. In one embodiment, the negative electrode 201*b* of the DC power supply 201 can be grounded.

A controller (not shown, similar to the controller 106 in FIG. 1) can control the switch elements 220, 230, 250, and 260 based on a plurality of parameters sensed by a plurality of sensors (now shown) and sent to the controller. In operation, based on the sensed parameters, when a first boosted voltage, a medium (or low) voltage, for example, 170 volts, is needed corresponding to a medium (or low) speed requirement of the variable speed electric machine, the controller can turn the second set of switches (switch element 250 and switch element 260) off. The first boost circuit 204 (including the first inductor 210, the first switch element 220, and the second switch element 230) can boost the input DC voltage to the first boosted voltage. In such scenario, the second inductor 240 is disconnected (i.e. not used) from the circuit. During boosting, the controller can control or command the switch elements 220 and/or 230 to charge the first inductor 210 and to change the state to transfer energy from the first inductor 210 into the DC link capacitor 203.

In operation, based on the sensed parameters, when a second boosted voltage, a high voltage, for example, 340 volts, is needed corresponding to a high speed requirement of the variable speed electric machine, the controller can turn the first set of switches (switch element 220 and 230) off. The first inductor 210 and the second boost circuit 205 (including the second inductor 240, the third switch element 250, and the fourth switch element 260) can boost the input DC voltage to the second boosted voltage. In such scenario, the first inductor 210 and the second inductor 240 are connected (or used) in series. During boosting, the controller can control or command the switch elements 250 and/or 260 to charge the first inductor 210 and the second inductor 240 and to change the state to transfer energy from the first inductor 210 and the second inductor 240 into the DC link capacitor 203. Compared with using one boost circuit for high voltage and another boost circuit for low voltage, the design shown in FIG. 2 (i.e. the combination of the first inductor 210 and the second inductor 240 for high voltage and the use of first inductor 210 for low voltage) could save parts (for example, inductor) since the cost and/or weight of inductors can be high.

Figure 3:
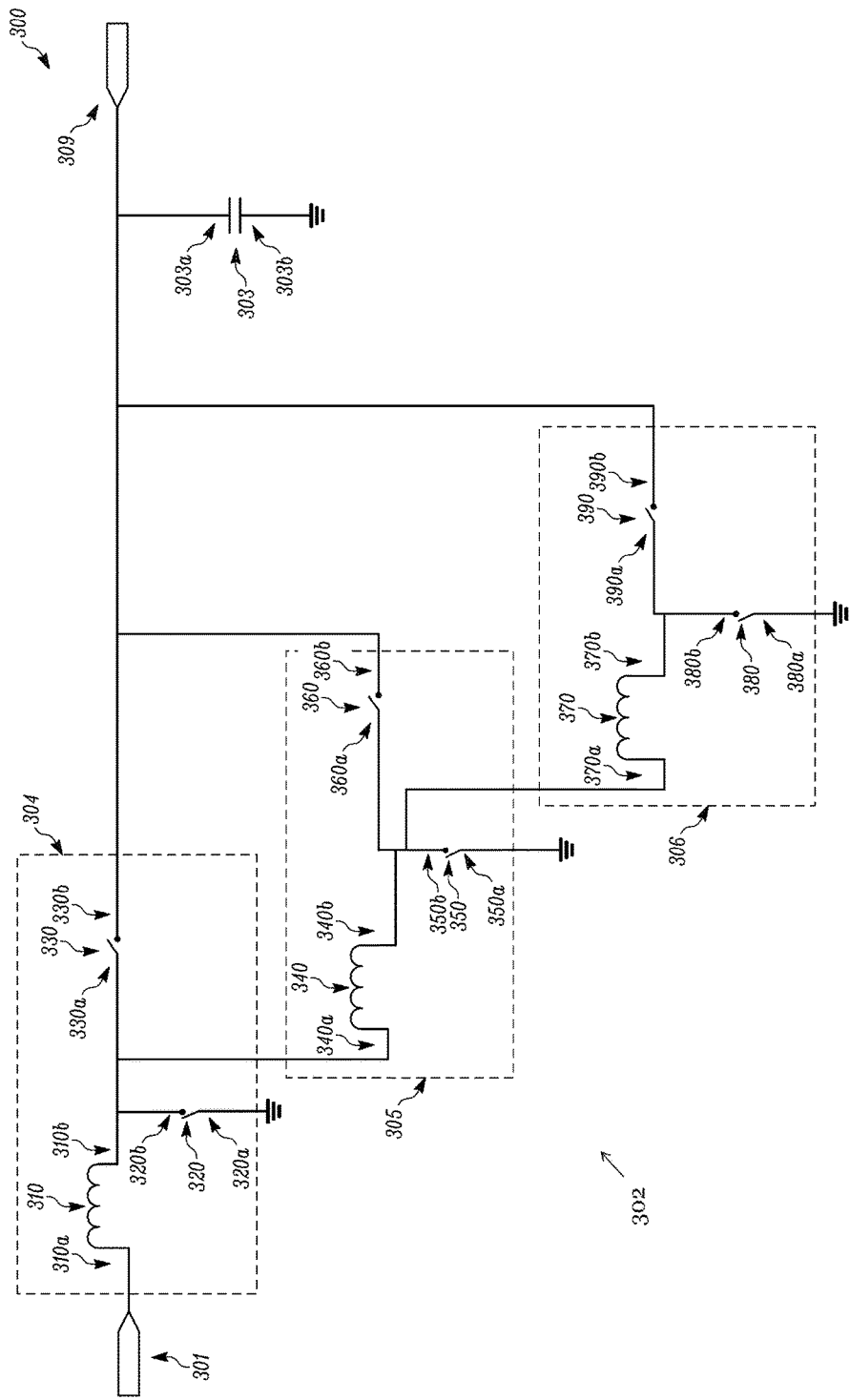
FIG. 3 is a circuit diagram of another DC to DC boost converter in a boost converter unit for a HVAC system, according to another embodiment.

FIG. 3 is a circuit diagram of another DC to DC boost converter 302 in a boost converter unit 300 for a HVAC system, according to some embodiments. The DC to DC boost converter unit 300 includes a DC power supply 301, a DC to DC boost converter 302, a DC link capacitor 303, and a load 309. The DC to DC boost converter 302 includes a first boost circuit 304, a second boost circuit 305, and a third boost circuit 306. The structure and function of the first boost circuit 304 and the second boost circuit 305 can be similar to the first boost circuit 204 and the second boost circuit 205 respectively in FIG. 2. The structure and function of the DC power supply 301 and the DC link capacitor 303 can be similar to the DC power supply 201 and the DC link capacitor 203 respectively in FIG. 2. The structure and function of the load 309 can be similar to the inverter circuit 104 combined with the variable speed electric machine 105 in FIG. 1.

In FIG. 3, the third boost circuit 306 includes a third inductor 370 and a third set of switches (a fifth switch element 380 and a sixth switch element 390). The third inductor 370 includes a first end 370a and a second end 370b. The fifth switch element 380 includes a source terminal 380a and a drain terminal 380b. The sixth switch element 390 includes a source terminal 390a and a drain terminal 390b. The first end 370a of the third inductor 370 connects to the second end 340b of the second inductor 340. The second end 370b of the third inductor 370 and the drain terminal 380b of the fifth switch element 380 connect to the source terminal 390a of the sixth switch element 390. The source terminal 380a of the fifth switch element 380 connects to the second end 303b of the DC link capacitor 303.

The drain terminal 390b of the sixth switch element 390 connects to the first end 303a of the DC link capacitor 303.

A controller (not shown, similar to the controller 106 in FIG. 1) can control the switch elements 320, 330, 350, 360, 380, and 390 based on a plurality of parameters sensed by a plurality of sensors (now shown) sent to the controller. In operation, based on the sensed parameters, when a first boosted voltage (i.e. a low voltage), is needed corresponding to a low speed requirement of the variable speed electric machine, the controller can turn both the second set of switches (switch element 350 and switch element 360) and the third set of switches (switch element 380 and switch element 390) off. The first boost circuit 304 (including the first inductor 310, the first switch element 320, and the second switch element 330) can boost the input DC voltage to the first boosted voltage. In such scenario, the second inductor 340 and the third inductor 370 are disconnected (i.e. not used) from the circuit. During boosting, the controller can switch the switch elements 320 and/or 330 to charge the first inductor 310 and to change the state to transfer energy from the first inductor 310 into the DC link capacitor 303.

In operation, based on the sensed parameters, when a second boosted voltage (i.e. a medium voltage) is needed corresponding to a medium speed requirement of the variable speed electric machine, the controller can turn both the first set of switches (switch element 320 and 330) and the third set of switches (switch element 380 and switch element 390) off. The first inductor 310 and the second boost circuit 305 (including the second inductor 340, the third switch element 350, and the fourth switch element 360) can boost the input DC voltage to the second boosted voltage. In such scenario, the first inductor 310 and the second inductor 340 are connected (or used) in series. The third inductor 370 is disconnected (i.e. not used) from the circuit. During boosting, the controller can switch the switch elements 350 and/or 360 to charge the first inductor 310 and the second inductor 340 and to change the state to transfer energy from the first inductor 310 and the second inductor 340 into the DC link capacitor 303.

In operation, based on the sensed parameters, when a third boosted voltage (i.e. a high voltage) is needed corresponding to a high speed requirement of the variable speed electric machine, the controller can turn both the first set of switches (switch element 320 and 330) and the second set of switches (switch element 350 and switch element 360) off. The first inductor 310, the second inductor 340, and the third boost circuit 306 (including the third inductor 370, the fifth switch element 380, and the sixth switch element 390) can boost the input DC voltage to the third boosted voltage. In such scenario, the first inductor 310, the second inductor 340, and the third inductor 370 are connected (or used) in series. During boosting, the controller can switch the switch elements 380 and/or 390 to charge the first inductor 310, the second inductor 340, and the third inductor 370, and to change the state to transfer energy from the first inductor 310, the second inductor 340, and the third inductor 370 into the DC link capacitor 303.

It is to be appreciated that the addition of new boost circuit(s) can go further to get a whole range of boosted voltages for a whole range of speeds/loads of the variable speed electric machine.

Figure 4:
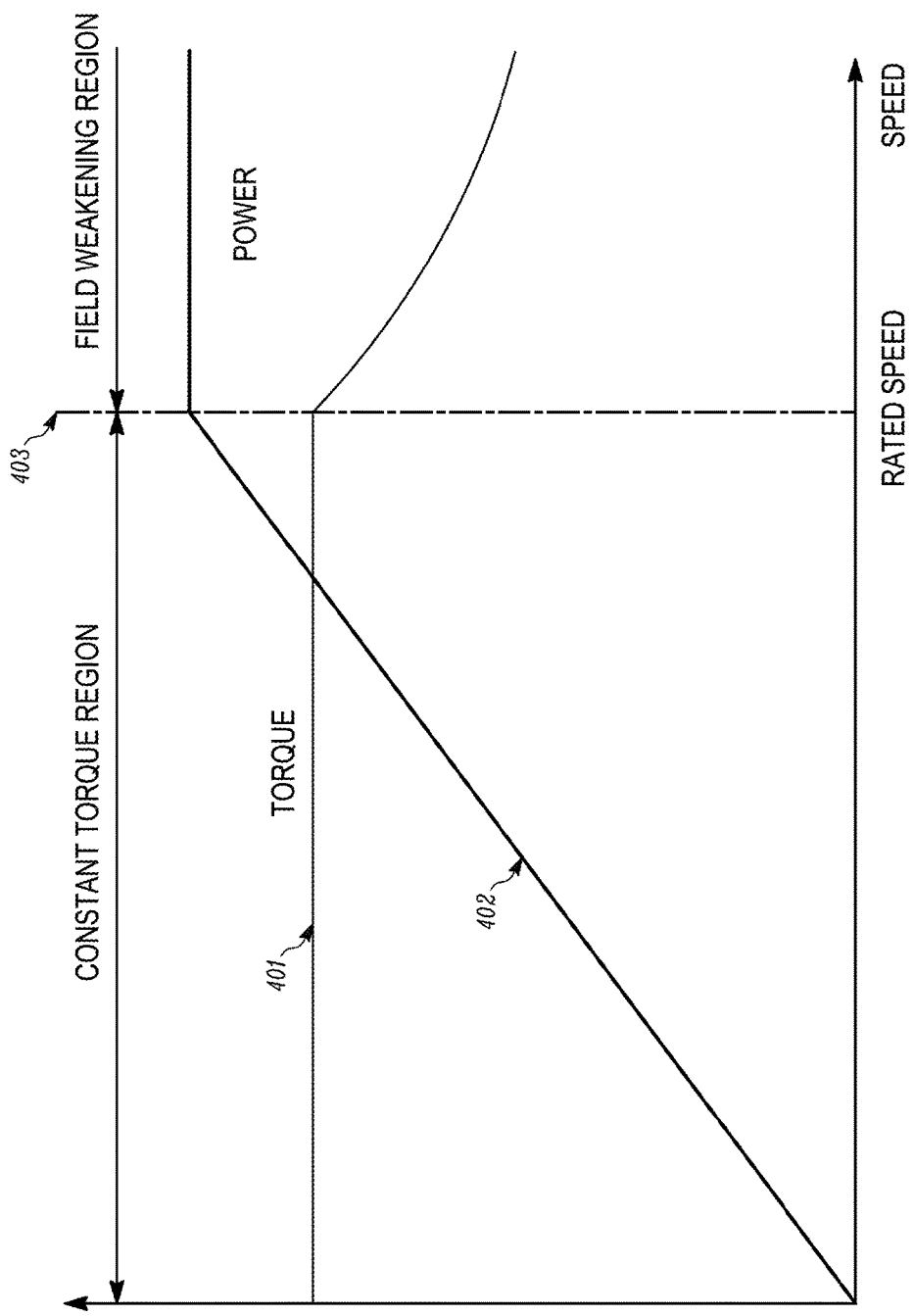
FIG. 4 illustrates a torque/power-speed relationship diagram of a variable speed electric machine, according to some embodiments.

FIG. 4 illustrates a torque/power-speed relationship diagram of a variable speed electric machine, according to some embodiments. In particular, FIG. 4 shows a first data curve 401 that illustrates the relationship between the torque and the speed of the variable speed electric machine. FIG. 4 also shows a second data curve 402 that illustrates the relationship between the power (voltage, current, and/or frequency) and the speed of the variable speed electric machine. In FIG. 4, at the rated speed (i.e. the speed at which the variable speed electric machine is designed to operate with an appropriate torque load) of the variable speed electric machine, there is a maximum torque per ampere (MTPA) point 403. Increasing the speed of the variable speed electric machine beyond the MTPA point 403, there is a field weakening region. This can lead to flux weakening, which means power would be spent to counteract the physical property of the variable speed electric machine. Before the MTPA point 403 is reached, the maximum torque remains constant (i.e. in a constant torque region) and the power needed to run the variable speed electric machine increases as the speed of the variable speed electric machine increases. It will be appreciated that current in the constant torque region can be a constant that is close to a maximum limit. Increasing the speed of the variable speed electric machine beyond the MTPA point 403 causes the maximum torque 401 to drop (i.e. in a field weakening region) while the power output by the variable speed electric machine remains constant. Different loads can have their own torque/power-speed relationship diagram and their own MTPA point.

To achieve increased efficiency (optimum operation) of the variable speed electric machine and the overall system, a controller (not shown) can be used to control a DC to DC boost converter to generate a variable boosted voltage based on the torque and/or power needed by the variable speed electric machine at the MTPA point 403 (or at the rated speed) for a particular load. In one embodiment, simulation data shows that by using a inverter-converter system as described in FIG. 1, there can be an about 125.1141 watts reduction in input power (input to the DC to DC boost converter), an about 10.42671 ampere reduction in input current (input to the DC to DC boost converter), and an about 17.87% efficiency gain in the system. It will be appreciated that efficiency gain can be calculated by comparing input power without the invention versus a simulated efficiency considering the DC to DC boost converter losses and new losses from the inverter and the variable speed electric machine. The simulation data is based on a two-speed electric machine that generates about 240 volts at full speed/power and about 120 volts at half speed/power, an about 12 volts input DC voltage to a DC to DC boost converter, a first boosted voltage about 170 volts, and a second boosted voltage about 340 volts. The detailed description of controlling the DC to DC boost converter by the controller based on the torque and/or power requirement needed by the variable speed electric machine is discussed above with respect to FIGS. 1-3.

Aspects

It is to be appreciated that any of aspects 1-5 can be combined with any of aspects 6-11, and that any of aspects 6-11 can be combined with aspect 12-14.

Aspect 1. A DC to DC boost converter for a HVAC system, comprising:
a first boost circuit having a first inductor and a first set of switches; and
a second boost circuit having a second inductor and a second set of switches,
wherein the first inductor is connected to the second inductor in series when the first set of switches is off;
wherein when the second set of switches is off, the first boost circuit is configured to boost an input DC voltage to a first boosted voltage; and
wherein when the first set of switches is off, the first inductor and the second boost circuit are configured to boost the input DC voltage to a second boosted voltage.

Aspect 2. The DC to DC boost converter according to aspect 1, wherein the first set of switches and the second set of switches are MOSFET switches.

Aspect 3. The DC to DC boost converter according to aspect 1 or aspect 2, wherein the first inductor and the second inductor are tapped winding electromagnetic coils.

Aspect 4. The DC to DC boost converter according to any one of aspects 1-3, further comprising:
a third boost circuit having a third inductor and a third set of switches,
wherein the first inductor, the second inductor, and the third inductor are connected in series when both the first set of switches and the second set of switches are off;
wherein when both the second set of switches and the third set of switches are off, the first boost circuit is configured to boost the input DC voltage to the first boosted voltage;
wherein when both the first set of switches and the third set of switches are off, the first inductor and the second boost circuit are configured to boost the input DC voltage to the second boosted voltage; and
wherein when both the first set of switches and the second set of switches are off, the first inductor, the second inductor, and the third boost circuit are configured to boost the input DC voltage to a third boosted voltage.

Aspect 5. The DC to DC boost converter according to any one of aspect 2-4, further comprising:
a DC link capacitor having a first end and a second end,
wherein the first inductor has a first end and a second end;
wherein the second inductor has a first end and a second end;
wherein the first set of switches includes a first switch element and a second switch element, the second set of switches includes a third switch element and a fourth switch element;
wherein the drain terminal of the second switch element and the drain terminal of the fourth switch element connect to the first end of the DC link capacitor;
wherein the source terminal of the first switch element and the source terminal of the third switch element connect to the second end of the DC link capacitor;
wherein the drain terminal of the third switch element and the source terminal of the fourth switch element connect to the second end of the second inductor; and
wherein the second end of the first inductor, the drain terminal of the first switch element, and the source terminal of the second switch element connect to the first end of the second inductor.

Aspect 6. An inverter-converter system for a HVAC system, comprising:
a DC to DC boost converter, the DC to DC boost converter includes:
a first boost circuit having a first inductor and a first set of switches, and
a second boost circuit having a second inductor and a second set of switches,
wherein the first inductor is connected to the second inductor in series when the first set of switches is off,
wherein when the second set of switches is off, the first boost circuit is configured to boost an input DC voltage to a first boosted voltage, and wherein when the first set of switches is off, the first inductor and the second boost circuit are configured to boost the input DC voltage to a second boosted voltage;
a DC source providing the input DC voltage to the DC to DC boost converter;
a variable speed electric machine; and
a controller that determines a load of the variable speed electric machine and controls the first and the second sets of switches based on the sensed load of the variable speed electric machine,
wherein the DC to DC boost converter is configured to source one of the first boosted voltage and the second boosted voltage to the variable speed electric machine based on the sensed load of the variable speed electric machine.

Aspect 7. The inverter-converter system according to aspect 6, further comprising:
an inverter circuit for converting one of the first boosted voltage and the second boosted voltage to an AC voltage,
wherein the variable speed electric machine is driven by the AC voltage.

Aspect 8. The inverter-converter system according to aspect 6 or aspect 7, wherein the input DC voltage is about 12 volts.

Aspect 9. The inverter-converter system according to any one of aspects 6-8, wherein the DC source is one of a battery source, a DC source, and a rectified AC source.

Aspect 10. The inverter-converter system according to any one of aspects 6-9, wherein the first boosted voltage is about 170 volts and the second boosted voltage is about 340 volts.

Aspect 11. The inverter-converter system according to any one of aspects 6-10, wherein the variable speed electric machine is a multi-speed AC-driven compressor.

Aspect 12. A method for operating a DC to DC boost converter, the DC to DC boost converter including: a first boost circuit having a first inductor and a first set of switches; and a second boost circuit having a second inductor and a second set of switches, wherein the first inductor is connected to the second inductor in series when the first set of switches is off,
the method comprising:
receiving an input DC voltage from a DC source;
sensing a load of a variable speed electric machine;
when the load of the variable speed electric machine is sensed to require a first boosted voltage, switching the second set of switches off and the first boost circuit boosting the input DC voltage to the first boosted voltage; and
when the load of the variable speed electric machine is sensed to require a second boosted voltage, switching the first set of switches off and the first inductor combined with the second boost circuit boosting the input DC voltage to the second boosted voltage.

Aspect 13. The method according to aspect 12, wherein the DC to DC boost converter further includes a third boost circuit having a third inductor and a third set of switches,
wherein the first inductor and the second inductor are connected to the third inductor in series when the first set of switches and the second set of switches are off,
the method further comprising:
when the load of the variable speed electric machine is sensed to require the first boosted voltage, switching the second set of switches and the third set of switches off and the first boost circuit boosting the input DC voltage to the first boosted voltage;
when the load of the variable speed electric machine is sensed to require the second boosted voltage, switching the first set of switches and the third set of switches off and the first inductor combined with the second boost circuit boosting the input DC voltage to the second boosted voltage; and
when the load of the variable speed electric machine is sensed to require a third boosted voltage, switching the first set of switches and the second set of switches off, and the first inductor and the second inductor combined with the third boost circuit boosting the input DC voltage to the third boosted voltage.

Aspect 14. The method according to aspect 12 or aspect 13, further comprising:
determining a flux weakening point for the load of the variable speed electric machine; and
determining the first and second boosted voltages based on the flux weakening point.

What is claimed is:
1. A DC to DC boost converter, comprising:
a first boost circuit having a first inductor and a first set of switches, the first inductor having a first end and a second end; and
a second boost circuit having a second inductor and a second set of switches, the second inductor having a first end and a second end,
wherein the first end of the first inductor connects to a DC source to receive an input DC voltage, the second end of the first inductor connects to the first end of the second inductor,
wherein the first inductor is connected to the second inductor in series when the first set of switches is off;
wherein when the second set of switches is off, the first set of switches is controlled to boost the input DC voltage to a first boosted voltage using the first inductor without the second inductor;
wherein when the first set of switches is off, the second set of switches is controlled to boost the input DC voltage to a second boosted voltage using the first inductor and the second inductor; and
wherein the second boosted voltage is greater than the first boosted voltage, the first boosted voltage is greater than the input DC voltage.

2. The DC to DC boost converter according to claim 1, wherein the first set of switches and the second set of switches are MOSFET switches.

3. The DC to DC boost converter according to claim 2, further comprising:
a DC link capacitor having a first end and a second end,
wherein the first set of switches includes a first switch element and a second switch element, the second set of switches includes a third switch element and a fourth switch element;
wherein the drain terminal of the second switch element and the drain terminal of the fourth switch element connect to the first end of the DC link capacitor;
wherein the source terminal of the first switch element and the source terminal of the third switch element connect to the second end of the DC link capacitor;
wherein the drain terminal of the third switch element and the source terminal of the fourth switch element connect to the second end of the second inductor; and
wherein the second end of the first inductor, the drain terminal of the first switch element, and the source terminal of the second switch element connect to the first end of the second inductor.

4. The DC to DC boost converter according to claim 1, wherein the first inductor and the second inductor are tapped winding electromagnetic coils.

5. The DC to DC boost converter according to claim 1, further comprising:

a third boost circuit having a third inductor and a third set of switches,
wherein the first inductor, the second inductor, and the third inductor are connected in series when both the first set of switches and the second set of switches are off;
wherein when both the second set of switches and the third set of switches are off, the first boost circuit is configured to boost the input DC voltage to the first boosted voltage;
wherein when both the first set of switches and the third set of switches are off, the first inductor and the second boost circuit are configured to boost the input DC voltage to the second boosted voltage; and
wherein when both the first set of switches and the second set of switches are off, the first inductor, the second inductor, and the third boost circuit are configured to boost the input DC voltage to a third boosted voltage.

6. The DC to DC boost converter according to claim 1, wherein the DC to DC boost converter is configured to provide the first boosted voltage to operate a compressor at a first speed, and the DC to DC boost converter is configured to provide the second boosted voltage to operate the compressor at a second speed that is greater than the first speed.

7. The DC to DC boost converter according to claim 6, wherein the DC to DC boost converter is connected to the compressor via an inverter.

8. An inverter-converter system, comprising:
a DC to DC boost converter, the DC to DC boost converter includes:
 a first boost circuit having a first inductor and a first set of switches, the first inductor having a first end and a second end, and
 a second boost circuit having a second inductor and a second set of switches, the second inductor having a first end and a second end,
 wherein the first end of the first inductor connects to a DC source to receive an input DC voltage, the second end of the first inductor connects to the first end of the second inductor,
 wherein the first inductor is connected to the second inductor in series when the first set of switches is off,
 wherein when the second set of switches is off, the first set of switches is controlled to boost the input DC voltage to a first boosted voltage using the first inductor without the second inductor,
 wherein when the first set of switches is off, the second set of switches is controlled to boost the input DC voltage to a second boosted voltage using the first inductor and the second inductor; and
 wherein the second boosted voltage is greater than the first boosted voltage, the first boosted voltage is greater than the input DC voltage;
the DC source providing the input DC voltage to the DC to DC boost converter;
a variable speed electric machine; and
a controller that determines a load of the variable speed electric machine and controls the first and the second sets of switches based on the sensed load of the variable speed electric machine,
wherein the DC to DC boost converter is configured to source one of the first boosted voltage and the second boosted voltage to the variable speed electric machine based on the sensed load of the variable speed electric machine.

9. The inverter-converter system according to claim 8, further comprising:

an inverter circuit for converting one of the first boosted voltage and the second boosted voltage to an AC voltage,
wherein the variable speed electric machine is driven by the AC voltage.

10. The inverter-converter system according to claim 8, wherein the input DC voltage is about 12 volts.

11. The inverter-converter system according to claim 8, wherein the DC source is one of a battery source, a DC source, and a rectified AC source.

12. The inverter-converter system according to claim 8, wherein the first boosted voltage is about 170 volts and the second boosted voltage is about 340 volts.

13. The inverter-converter system according to claim 8, wherein the variable speed electric machine is a multi-speed AC-driven compressor.

14. The inverter-converter system according to claim 8, wherein the variable speed electric machine is a compressor, the DC to DC boost converter is configured to provide the first boosted voltage to operate the compressor at a first speed, and the DC to DC boost converter is configured to provide the second boosted voltage to operate the compressor at a second speed that is greater than the first speed.

15. The inverter-converter system according to claim 14, wherein the DC to DC boost converter is connected to the compressor via an inverter.

16. A method for operating a DC to DC boost converter, the DC to DC boost converter including a first boost circuit having a first inductor and a first set of switches, the first inductor having a first end and a second end; and a second boost circuit having a second inductor and a second set of switches, the second inductor having a first end and a second end, wherein the first end of the first inductor connects to a DC source to receive an input DC voltage, the second end of the first inductor connects to the first end of the second inductor, wherein the first inductor is connected to the second inductor in series when the first set of switches is off, the method comprising:
receiving the input DC voltage from the DC source;
sensing a load of a variable speed electric machine;
when the load of the variable speed electric machine is sensed to require a first boosted voltage, switching the second set of switches off and the first set of switches being controlled to boost the input DC voltage to the first boosted voltage using the first inductor without the second inductor; and
when the load of the variable speed electric machine is sensed to require a second boosted voltage, switching the first set of switches off and the second set of switches being controlled to boost the input DC voltage to the second boosted voltage using the first inductor and the second inductor,
wherein the second boosted voltage is greater than the first boosted voltage, the first boosted voltage is greater than the input DC voltage.

17. The method according to claim 16, wherein the DC to DC boost converter further includes a third boost circuit having a third inductor and a third set of switches,
wherein the first inductor and the second inductor are connected to the third inductor in series when the first set of switches and the second set of switches are off,
the method further comprising:
when the load of the variable speed electric machine is sensed to require the first boosted voltage, switching the second set of switches and the third set of switches off and the first boost circuit boosting the input DC voltage to the first boosted voltage;

when the load of the variable speed electric machine is sensed to require the second boosted voltage, switching the first set of switches and the third set of switches off and the first inductor combined with the second boost circuit boosting the input DC voltage to the second boosted voltage; and when the load of the variable speed electric machine is sensed to require a third boosted voltage, switching the first set of switches and the second set of switches off, and the first inductor and the second inductor combined with the third boost circuit boosting the input DC voltage to the third boosted voltage.

18. The method according to claim 16, further comprising: the DC to DC boost converter providing the first boosted voltage to operate a compressor at a first speed; and the DC to DC boost converter providing the second boosted voltage to operate the compressor at a second speed that is greater than the first speed.

19. The method according to claim 18, wherein the DC to DC boost converter is connected to the compressor via an inverter.

* * * * *